(12) United States Patent
Zeng et al.

(10) Patent No.: US 7,303,606 B2
(45) Date of Patent: Dec. 4, 2007

(54) OXY-FUEL COMBUSTION PROCESS

(75) Inventors: Yongxian Zeng, Edison, NJ (US); Divyanshu R. Acharya, Bridgewater, NJ (US); Satish S. Tamhankar, Scotch Plains, NJ (US); Narayanan Ramprasad, Hillsborough, NJ (US); Ramakrishnan Ramachandran, Allendale, NJ (US); Frank R. Fitch, Bedminster, NJ (US); Donald L. MacLean, Clinton, NJ (US); Jerry Y. S. Lin, Scottsdale, AZ (US); Richard H. Clarke, Abingdon (GB)

(73) Assignee: The BOC Group, Inc., Murray Hill, NJ (US)

( * ) Notice: Subject to any disclaimer, the term of this patent is extended or adjusted under 35 U.S.C. 154(b) by 332 days.

(21) Appl. No.: 11/092,345

(22) Filed: Mar. 29, 2005

(65) Prior Publication Data

US 2005/0223891 A1 Oct. 13, 2005

Related U.S. Application Data

(63) Continuation-in-part of application No. 10/313,876, filed on Dec. 6, 2002, now abandoned.

(60) Provisional application No. 60/346,582, filed on Jan. 8, 2002, provisional application No. 60/346,597, filed on Jan. 8, 2002, provisional application No. 60/347,268, filed on Jan. 10, 2002.

(51) Int. Cl.
*B01D 53/04* (2006.01)

(52) U.S. Cl. .............................. 95/114; 95/138; 95/148; 431/11; 502/525

(58) Field of Classification Search .................. 95/114, 95/115, 138, 148; 60/649; 431/2, 5, 11; 110/345; 502/400, 525; 423/219
See application file for complete search history.

(56) References Cited

U.S. PATENT DOCUMENTS

| | | |
|---|---|---|
| 3,922,204 A | 11/1975 | Tseung et al. |
| 4,348,213 A | 9/1982 | Armond |
| 4,363,787 A | 12/1982 | Yoon |
| 4,378,336 A | 3/1983 | Yoon |
| 4,522,894 A | 6/1985 | Hwang et al. |

(Continued)

FOREIGN PATENT DOCUMENTS

EP 0 913 184 A1 5/1999

(Continued)

OTHER PUBLICATIONS

Yue-Sheng Lin, Weijian Wang, Jonghee Han; "Oxygen Permeation Through Thin Mixed-Conducting Solid Oxide Membranes," AIChE Journal, May 1994, vol. 40, No. 5, pp. 786-798.

(Continued)

*Primary Examiner*—Frank M. Lawrence
(74) *Attorney, Agent, or Firm*—Philip H. Von Neida

(57) ABSTRACT

Production of oxygen-enriched gas streams is disclosed herein. Air streams contact an oxygen-selective mixed conductor particularly a perovskite material whereby oxygen is retained or adsorbed on the perovskite and can be employed in a variety of processes such as in combusting a fuel gas, heat recovery and boiler related operations.

17 Claims, 4 Drawing Sheets

U.S. PATENT DOCUMENTS

| | | | |
|---|---|---|---|
| 4,844,837 A | 7/1989 | Heck et al. |
| 4,897,253 A | 1/1990 | Jenkins |
| 5,023,276 A | 6/1991 | Yarrington et al. |
| 5,441,581 A | 8/1995 | Van den Sype et al. |
| 5,486,313 A | 1/1996 | De Jong et al. |
| 5,510,056 A | 4/1996 | Jacobs et al. |
| 5,616,223 A | 4/1997 | Shen et al. |
| 5,628,931 A | 5/1997 | Lednor et al. |
| 5,639,401 A | 6/1997 | Jacobs et al. |
| 5,648,582 A | 7/1997 | Schmidt et al. |
| 5,654,491 A | 8/1997 | Goetsch et al. |
| 5,658,497 A | 8/1997 | Kumar et al. |
| 5,663,473 A | 9/1997 | Griffiths et al. |
| 5,720,901 A | 2/1998 | De Jong et al. |
| 5,785,774 A | 7/1998 | Van Den Sype et al. |
| 5,888,272 A | 3/1999 | Prasad et al. |
| 5,905,180 A | 5/1999 | Yokoyama et al. |
| 5,921,771 A | 7/1999 | Kobayashi |
| 5,968,457 A | 10/1999 | Van Den Sype et al. |
| 6,051,162 A | 4/2000 | Vandensype et al. |
| 6,059,858 A | 5/2000 | Lin et al. |
| 6,072,097 A | 6/2000 | Yokoyama et al. |
| 6,129,862 A | 10/2000 | Munakata et al. |
| 6,132,693 A | 10/2000 | Gruenwald et al. |
| 6,143,203 A | 11/2000 | Zeng et al. |
| 6,254,807 B1 | 7/2001 | Schmidt et al. |
| 6,267,912 B1 | 7/2001 | Hershkowitz et al. |
| 6,329,434 B1 | 12/2001 | Wen et al. |
| 6,361,584 B1 | 3/2002 | Stevens et al. |
| 6,365,543 B1 | 4/2002 | Schmidt et al. |
| 6,379,586 B1 | 4/2002 | Zeng et al. |
| 6,395,944 B1 | 5/2002 | Griffiths et al. |
| 6,402,988 B1 | 6/2002 | Gottzmann et al. |
| 6,402,989 B1 | 6/2002 | Gaffney |
| 6,403,051 B1 | 6/2002 | Keller |
| 6,409,940 B1 | 6/2002 | Gaffney et al. |
| 6,433,234 B1 | 8/2002 | Griffiths et al. |
| 6,447,745 B1 | 9/2002 | Feeley et al. |
| 6,452,061 B1 | 9/2002 | Schmidt et al. |
| 6,455,597 B2 | 9/2002 | Hohn et al. |
| 6,461,539 B1 | 10/2002 | Gaffney |
| 6,479,704 B1 | 11/2002 | Nordquist et al. |
| 6,568,185 B1 | 5/2003 | Marin et al. |
| 6,592,782 B2 | 7/2003 | MacKay et al. |
| 2002/0078906 A1 | 6/2002 | Prasad et al. |
| 2002/0166323 A1 | 11/2002 | Marin et al. |

FOREIGN PATENT DOCUMENTS

| | | |
|---|---|---|
| EP | 0 928 938 A1 | 7/1999 |
| EP | 0 947 484 A1 | 10/1999 |
| WO | WO 99/48805 | 9/1999 |

OTHER PUBLICATIONS

Patent Abstracts of Japan, Publication No. 59056605, "Oxygen Combustion Method for Heavy Oil," (Miura Engineering International KK), Apr. 2, 1984.

V.V. Wadekar, "Compact Heat Exchangers," CEP, Dec. 2000, www.aiche.org/cep/, pp. 39-49.

OXY-FUEL COMBUSTION PROCESS

This application claims priority from U.S. patent application Ser. No. 10/313,876 filed Dec. 6, 2002 now abandoned, which claims priority from Provisional U.S. Patent Applications 60/346,582 filed Jan. 8, 2002; 60/346,597 filed Jan. 8, 2002; and 60/347,268 filed Jan. 10, 2002.

BACKGROUND OF THE INVENTION

The primary purpose of combustion processes is to generate heat. In a power plant or in an industrial boiler system, the heat is utilized to generate high pressure steam which in turn may be used to provide process heating or may be used to produce electricity. Most conventional combustion processes utilize air as a source of oxygen. The presence of nitrogen in air does not benefit the combustion process and may even create problems. For example, nitrogen will react with oxygen at combustion temperatures forming nitrogen oxides (NOx), an undesirable pollutant. In many cases, the products of combustion must be treated to reduce nitrogen oxide emissions below environmentally acceptable limits. Moreover, the presence of nitrogen increases the flue gas volume which in turn increases the heat losses and decreases the thermal efficiency of the combustion process. Additionally, high nitrogen content in the flue gas may make it unattractive to capture $CO_2$ either as a product or for sequestration. With the current emphasis on $CO_2$ sequestration to alleviate harmful effects of global warming, it is critical to develop processes which will enable $CO_2$ capture in a cost effective way.

One way to eliminate nitrogen from the combustion exhaust or flue gas is to use pure oxygen in the combustion process instead of air. However, combustion with oxygen generates very high temperatures and therefore some of the flue gas produced must be recycled to moderate temperatures. This in turn dilutes the oxygen content to about 27% (remaining ~73% is $CO_2$ and water) and maintains the flame temperature to the same value. While such a scheme would eliminate the problems associated with nitrogen, the cost of oxygen at present is too high to make it economically attractive.

Production of oxygen-enriched gas stream using ion transport ceramic membrane is discussed in U.S. Pat. No. 5,888,272 which discloses a process for separating a feed gas stream into an oxygen-enriched gas stream which is used in a combustor and an oxygen-depleted gas stream. The feed gas stream is compressed, and oxygen is separated from the compressed feed gas stream using an ion transport module including an ion transport membrane having a retentate side and a permeate side. The permeate side of the ion transport membrane is purged with at least a portion of a combustion product gas stream obtained from the combustion in the combustor of the gas stream exiting the permeate side of the ion transport module. The disadvantages of this method of oxygen production are the high cost of fabrication of the membrane and the difficulty in producing membrane structures that are leak-proof. Also, oxygen recovery is typically low in membrane units.

The present invention is based on the use of high-temperature, oxygen-selective ceramic materials made in particulate form to produce a substantially nitrogen-free oxygen stream suitable for oxy-fuel application, and may provide an attractive option to reduce oxygen cost. Such systems utilize either pressure swing or temperature swing mode since the oxygen retention capacity of the ceramic material is strongly dependent on temperature and pressure. The process normally operates at temperatures greater than 300° C. and offers several advantages, including high oxygen capacity and large oxygen selectivity. A key advantage of this process is that it uses the oxygen-selective material in conventional pellet form in fixed bed reactors, which can be designed using traditional methods. Thus, the process can be commercially adopted more easily compared to the membrane based process mentioned above, which requires special fabrication, sealing and assembly procedures, and is known to have several issues in this regard. An additional advantage of the fixed bed, ceramic-based system is that it can directly produce an oxygen containing stream, substantially free of nitrogen, with the oxygen concentration suitable for oxy-fuel application. This is unlike conventional processes, such as cryogenic air separation method, which first produce high purity oxygen, and require subsequent dilution to get the required oxygen concentration.

The present invention is aimed at reducing the cost of oxygen by producing substantially nitrogen-free oxygen containing stream suitable for use in an oxygen consuming process. It relates to the use of a high-temperature, oxygen generation system to produce an oxygen-containing stream, substantially free of nitrogen. More particularly, it describes the use of an oxygen-selective ceramic material to separate oxygen from an air stream to produce an oxygen containing stream which can be employed as an oxygen source instead of air in an oxygen consuming process such as an industrial boiler or fired heater.

SUMMARY OF THE INVENTION

The present invention is directed to a method for forming a product gas stream for use in an oxygen consuming process comprising cyclically the steps:

a) feeding air through a reactor containing an oxygen selective mixed conductor, whereby oxygen is retained on the oxygen selective mixed conductor and the reactor is at a temperature greater than 300° C.; and b) feeding an oxygen-depleted gas stream through the reactor, whereby oxygen is released from the oxygen selective mixed conductor.

The oxygen-selective mixed conductor is a perovskite type ceramic having the structural formula $A_{1-x}M_xBO_{3-\delta}$, wherein A is a rare earth ion, M is Sr, Ca, Ba, V or mixtures of these; B is Co, Mn, Cr, Fe or mixtures of these; x varies from greater than 0 to about 1; and $\delta$ is the deviation from stoichiometric composition resulting from the substitution of Sr, Ca and Ba for rare earth ions. Preferably, x varies from about 0.1 to about 1, most preferably about 0.2 to 1, and A is La, Y or mixtures of these; M is Sr, Ca or mixtures of these; and B is Co, Fe or mixtures of these.

The method may be practiced with one or more reactors present. The air and the oxygen depleted gas streams are fed to the reactor in either a cocurrent or a counter-current manner.

During the oxygen retention step (a) of the method, a nitrogen-rich gas is produced as the byproduct and an oxygen-containing stream substantially free of nitrogen is generated during step (b). The oxygen-containing stream substantially free of nitrogen is fed to an oxygen consuming process. The oxygen consuming process is a process selected from the group consisting of a chemical oxidation process, a partial oxidation process, a boiler, a combustion process, and a gasification process.

In a further embodiment of the present invention, there is disclosed a method of operating an oxygen consuming process comprising sequentially the steps:

a) feeding air through a reactor containing an oxygen selective mixed conductor, whereby oxygen is retained on the oxygen selective mixed conductor and the reactor is at a temperature greater than 300° C.;

b) feeding at least part of an oxygen-depleted product gas from the oxygen consuming process into the reactor, thereby forming an oxygen-containing gas stream substantially free of nitrogen; and c) feeding the oxygen-containing gas stream substantially free of nitrogen into the oxygen consuming process.

The oxygen-selective mixed conductor is a perovskite type ceramic as described above. The oxygen-containing gas stream substantially free of nitrogen is fed to the oxygen consuming process at temperatures greater than 150° C. and at pressures of about 1 to about 20 bar.

In this method, steps (a) and (b) can be performed cyclically. The air and the oxygen depleted product gas stream can be fed to the reactor in a cocurrent manner or they can be fed to the reactor in a counter-current manner.

The by-product produced during the oxygen retention step (a) is a nitrogen-rich gas. Step (c) of this method will further produce a product gas stream comprising carbon dioxide which can be recovered for other uses.

In a further embodiment of the present invention, there is disclosed a method for forming a product gas stream for use in an oxygen consuming process comprising the steps:

(a) feeding air through a first heat exchanger and into a reactor containing an oxygen selective mixed conductor, whereby oxygen is retained on the oxygen selective mixed conductor and the reactor is at a temperature greater than 300° C.; and (b) feeding an oxygen-depleted gas stream through a second heat exchanger and through the reactor, whereby oxygen is released from the oxygen selective mixed conductor forming the product gas stream.

The method is cyclical and is thermally self-sustaining. The oxygen selective mixed conductor is a perovskite as described above.

A fuel gas may be added to the oxygen-depleted gas stream and is preferably selected from the group consisting of carbon monoxide, hydrogen, methane or mixtures thereof.

The heat exchangers employed in this method can be multi-pass heat exchangers and the first heat exchanger and the second heat exchanger are arranged so that they can be internal heat exchangers, external heat exchangers and combinations of internal and external heat exchangers.

The air and the oxygen-depleted gas stream are fed to the reactor in a counter-current manner. In this method for forming a gas stream a nitrogen-rich gas is produced as a by-product during the oxygen retention step (a).

The second heat exchanger increases the temperature of the oxygen-depleted gas stream to about 900° C. which can contain up to about 5% oxygen.

In describing the invention by way of schematic drawings and through examples, a boiler is used as a representative oxygen consuming process. It is to be understood that the methods of the present invention can be applied to other oxygen consuming processes such as complete or partial oxidation of hydrocarbons, selective oxidation processes for the production of chemicals, combustion, gasification, etc.

DETAILED DESCRIPTION OF THE PREFERRED EMBODIMENTS

Figure 1:
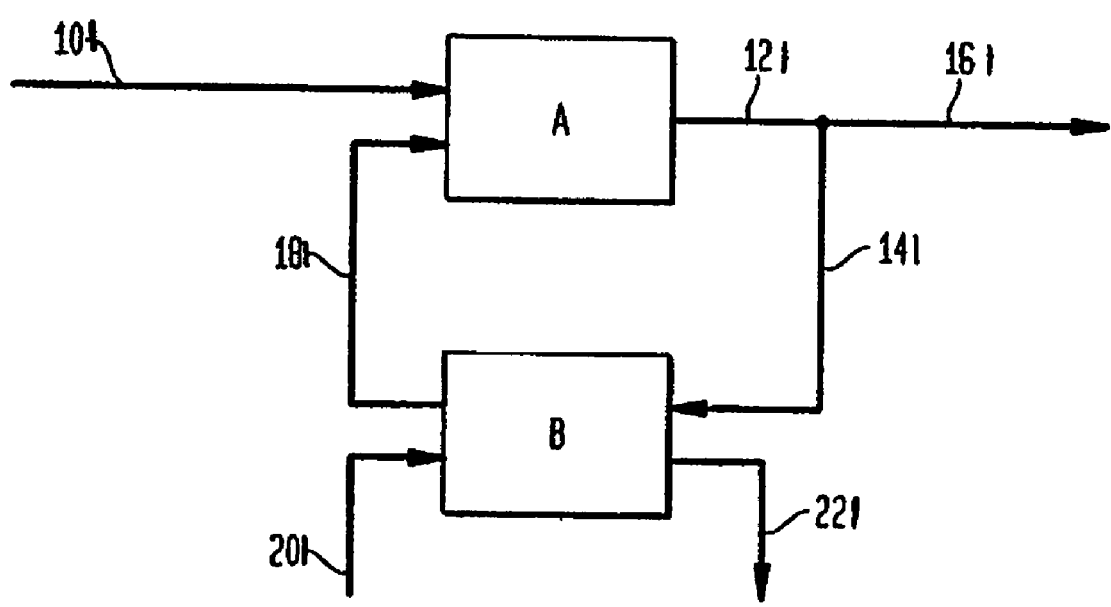
FIG. 1 is a schematic representation of a boiler and the ceramic oxygen generation system as practiced by the present invention.

FIG. 1 is a schematic embodiment of an oxygen consuming process such as a boiler or fired heater and an oxygen generation ceramic system B. Contained therein in B is the oxygen-selective ceramic material. Line 101 carries fuel gas to the boiler A. The fuel can be selected from the group consisting of $CH_4$, $H_2$, $CO$, $C_2H_4$, $C_2H_6$ and mixtures thereof or can be coal, char or other solids as well as various refinery waste streams, fuel oils, etc. or any suitable combustible material. The combustion exhaust gas or flue gas, which consists primarily of carbon dioxide and water vapor, exits combustion/heat recovery zone A through line 121. A part of the combustion exhaust gas is directed through line 141 to the oxygen generation system B. Compressed air enters the oxygen generation system through line 201. Oxygen lean stream containing mainly nitrogen, up to 98%, exits the oxygen generation system through line 221. Oxygen from the air is retained onto the oxygen-selective ceramic material. The combustion exhaust gas enters the system B, removes this oxygen and regenerates the ceramic material. The gas leaves through line 181 as substantially nitrogen-free oxygen rich gas and enters the boiler A whereby combustion can occur anew.

The ceramic system primarily comprises at least 2 reactors filled with high temperature oxygen-selective ceramic material, such as perovskite material, and an inert ceramic material for internal heat exchange, optional multi-pass heat exchangers and switchover valves. The process is cyclic and may be compared to a pressure swing retention process. Briefly, air is passed into first bed where oxygen is preferentially retained onto the material and oxygen lean stream is withdrawn from the top of the bed. Once the material becomes at least in part saturated with oxygen, the operation is transferred to another vessel. The first bed is now purged with the combustion exhaust gas or recycled flue gas, which removes at least part of the oxygen and as a result also regenerates the material. Minimum of two reactors are required to ensure continuous operation.

Figure 2:
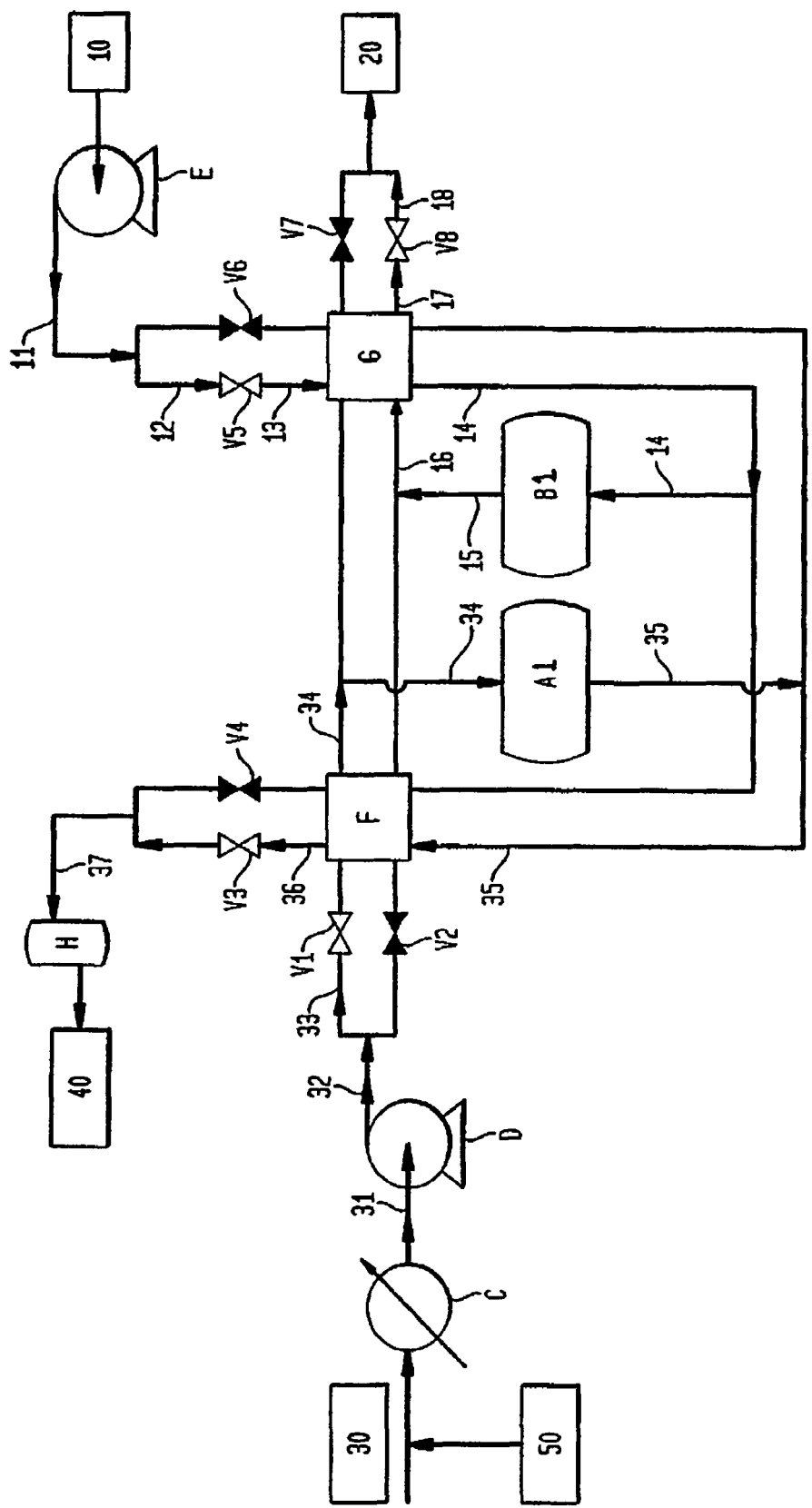
FIG. 2 is a schematic representation of the ceramic oxygen generation system for oxyfuel application as practiced in the present invention.

Turning now to FIG. 2, air is compressed through cooler C and blower D through line 31, and, after passing through multi-pass heat exchanger F, will pass through one of the beds A1 or B1, which contains high temperature oxygen-selective ceramic material, such as perovskite material. Oxygen will be retained on the perovskite and nitrogen will leave the bed as effluent. In the case of bed A1 receiving air, this effluent gas stream will then pass up again through line 31 and one of the multi-pass heat exchangers F and will leave the cyclic system. While one bed is undergoing the air step, the second perovskite bed in this case B1 which is already partially saturated with oxygen is purged with the recycled flue gas stream through line 14. Like air, the recycled flue gas also passes through a multi-pass heat exchanger G before passing through the perovskite bed. As the recycled flue gas passes through the bed, it picks up the oxygen rich gas then leaves the bed through lines 15 and 16, through the multi-pass exchanger, exchanging heat with the incoming recycled flue gas.

FIG. 2 is described here with bed B1 on air step and bed A1 on recycled flue gas or regeneration step. Air is first compressed to the desired pressure using air blower E. The compressed air is fed to the multi-pass heat exchanger G through valve V5. Valve V6 is closed during this step. Air is heated in exchanger G by exchanging heat with the returning oxygen-lean stream 16. The heated air, 14, is fed to the perovskite bed B1. The oxygen-lean stream, 15, exits bed B1, exchanges heat with incoming air in exchanger G and then leaves the system through valve V8 as stream 20.

30 represents the boiler system which is the oxygen-consuming process. Line 31 is the oxygen line from the cooler C to the blower D. Line 32 is the line from the blower D to line 33 which will connect with valve V1. Valve V2 is the valve connecting line 33 to the multi-pass heat exchanger F. Line 36 connects the multi-pass heat exchanger to valve V3 which directs an oxygen-rich stream to line 37 through the buffer tank H and into the storage tank 40. The oxygen-rich stream may also pass through valve V4 and through the multi-pass heat exchanger F to line 34 which connects to heat exchanger G, where it is directed through line A and bed B1 as the feed steam.

Recycled flue gas from the boiler is first cooled in cooler C and then compressed in blower D prior to feeding it into multi-pass heat exchanger F through valve V1. Once heated, it passes through bed A1, which is saturated with oxygen. The oxygen rich stream, 35, leaves the bed from the bottom, passes through the exchanger F and into the buffer tank H through valve V3.

Air is derived from source 10 to blower E which directs the air through line 11 connecting to line 12 which connects with valve V5 and line 13. Line 13 carrying the air contacts the heat exchanger G. The heated air, after passing through heat exchanger G, travels through line 17 to valve V8. The now cooled air stream will travel through line 18 around to valve V7 where it can re-enter the heat exchanger G.

A typical valve sequence is given in the table below:

of a suitable fuel such as carbon monoxide, hydrogen, methane or a combination thereof in an amount at least sufficient to react with the excess oxygen present in the flue gas (stream 50 in FIG. 2). This combustion generates heat necessary for the cyclical process. The amount of fuel gas added is adjusted so as to generate sufficient heat. Any excess fuel added reacts with the oxygen stored on the perovskite. If higher temperature results due to the combustion, it helps extract more oxygen from the perovskite.

Alternatively yet, the boiler is operated under conditions of excess oxygen to assure complete combustion of all the fuel. In this case, the flue gas can contain up to 5% by volume oxygen. This flue gas is passed through an optional reactor to which a controlled amount of fuel gas as described above is added. The reactor may contain a catalyst such as a supported noble metal catalyst. The oxygen is consumed in this reactor by a reaction with the added fuel gas. As described above, a portion of the resulting gas after heat recovery is then fed to the perovskite reactor for generating the oxygen-containing gas stream. The combustion catalyst can be separate or may be combined with the perovskite in the same reactor, as a layer at the entrance to the reactor. Also, a layer of perovskite can act as a combustion catalyst.

Figure 3:
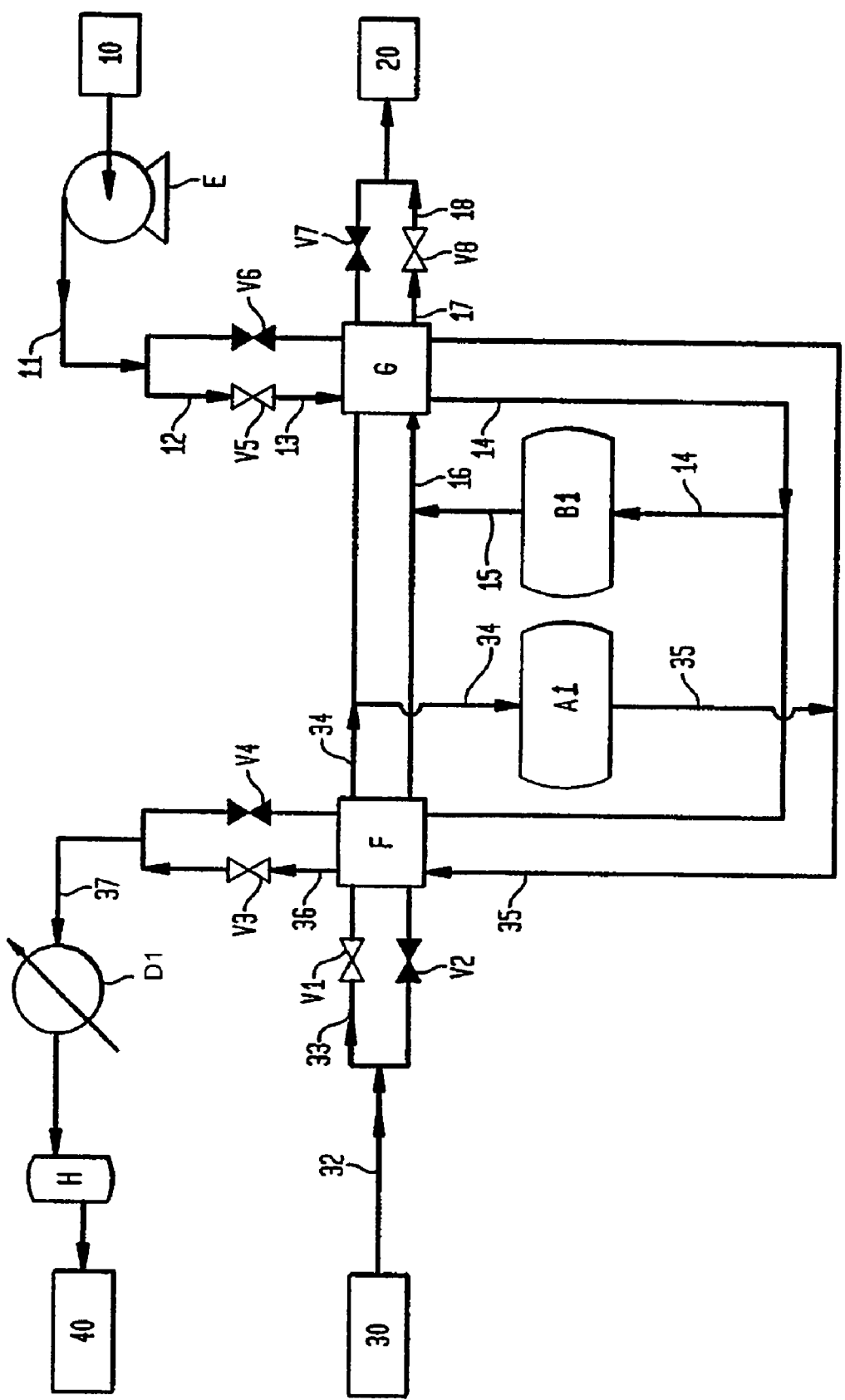
FIG. 3 is a schematic representation of a ceramic oxygen generation system with steam purge as practiced in the present invention.

Alternatively, the oxygen-containing gas leaving the perovskite reactor is cooled to separate the water in the stream as condensate thereby increasing the concentration of oxygen in the stream returning to the oxygen consuming process. The increased oxygen concentration may be beneficial to the oxygen consuming process operation and may provide more flexibility to the operation of the oxygen consuming process. An extension of this scheme is to use steam only as a regeneration gas as shown in FIG. 3. The numbering of FIG. 2 is the same as FIG. 3 except as to the inclusion of cooler D1 prior to buffer tank H. The main advantage of this scheme is that oxygen can be produced in any concentration by cooling the oxygen-rich stream and condensing the steam out. Since the process still operates at low pressure, only low-pressure steam is necessary. The availability of low-pressure steam is usually not a problem as schemes pre-

| Step | Duration Sec | Bed A Feed | Bed B Feed | Valves | | | | | | | |
|---|---|---|---|---|---|---|---|---|---|---|---|
| | | | | V1 | V2 | V3 | V4 | V5 | V6 | V7 | V8 |
| 1 | 30 | Air | Flue Gas | open | close | open | Close | open | Close | open | Close |
| 2 | 30 | Flue Gas | Air | close | open | close | Open | close | Open | close | Open |

The present invention can be integrated with an oxygen consuming process such as a boiler or fired heater in several ways with an objective of improving the efficiency. In one embodiment of this process, the boiler is operated under slightly under-oxidized conditions so that the flue gas contains no oxygen but contains a small amount of carbon monoxide and hydrogen. The carbon monoxide and hydrogen are burned in the perovskite reactor to generate heat required to sustain and improve the cyclical operation of the perovskite reactor.

Alternatively, the boiler is operated under conditions such that the fuel is completely burned and a small amount of excess oxygen is present in the flue gas, typically about 0.5 volume %. In this case, the recycle flue gas is fed to the perovskite reactor along with the addition of a small amount sented here are integrated as part of an overall boiler or power plant or other oxygen consuming process.

In one embodiment, water is removed from the recycled flue gas before it enters the ceramic oxygen generation system so that it consists of mainly $CO_2$. It has been discovered that when the purge gas in the oxygen extraction step is $CO_2$, the amount of oxygen recovered from the ceramic bed is higher compared to other gases such as $N_2$ or steam. This is believed to be due to exothermic retention of $CO_2$ on the ceramic material leading to greater oxygen release.

The schemes presented in FIGS. 2 and 3 are based on partial pressure swing process, i.e. the driving force for extraction of stored oxygen is provided by the difference in partial pressure of oxygen between the oxygen retention and extraction steps. The pressure to which the air is compressed is mainly determined by the required concentration of oxygen in the oxygen-rich stream. According to the invention, air is fed at a pressure of 15-400 psia, preferably 15-100 psia, and more preferably 20-40 psia, and the recycled flue gas at 0.1-200 psia, preferably 8-50 psia, and more preferably 10-30 psia, so that the pressure difference between the two streams at the entrance to the reactor is maintained between 5 and 20 psi.

Figure 4:
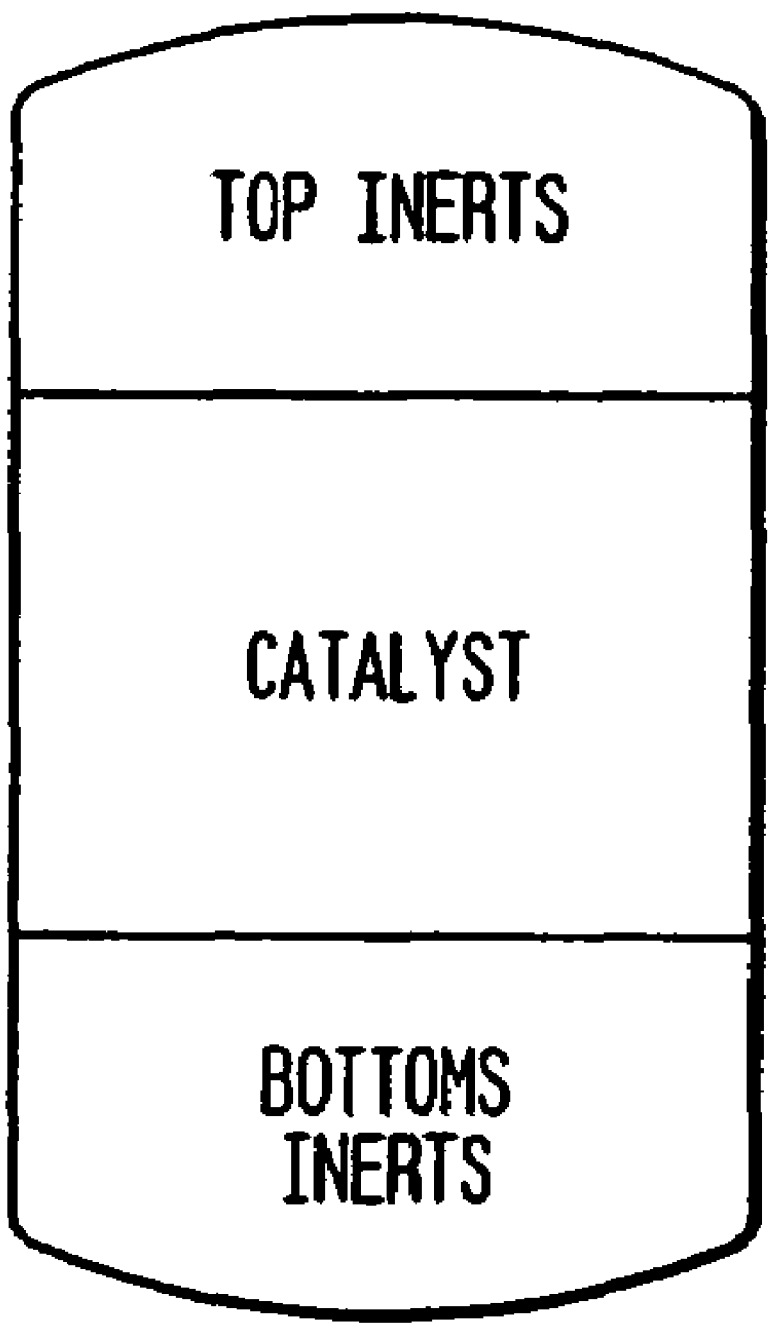
FIG. 4 is a schematic representation of ceramic oxygen generation reactor showing the layer arrangement.

The schemes presented here relate to the concepts employed in ensuring efficient heat management. For example, one aspect of the invention provides for the use of inert materials for regenerative heat transfer in cyclic catalytic processes. The reactor configuration with inert materials is shown in FIG. 4. In particular, such regenerative heat transfer is used in conjunction with at least one external heat exchanger to achieve the desired heat transfer for the overall process. Through heat exchange with these inert materials, temperatures of hot gas streams exiting a reactor can be significantly reduced, e.g., to below about 900° C., and preferably as low as about 500° C. Such a reduced gas stream temperature allows use of low-cost construction materials, and results in corresponding cost reduction, as well as an increased operating life of the external heat exchanger required for additional heat transfer.

While such a heat transfer scheme is generally applicable to any cyclic process, it is particularly well-suited for processes with relatively high operating temperatures, e.g., about 250° C. or higher, where the unavailability of switchover valves for high temperature operation necessitates that all hot gas streams be effectively cooled so that standard valves can be employed. Furthermore, it is also well-suited to cyclic processes with relatively short cycle times, such as those in which the heating and cooling times are below about a minute, e.g., between about 15 to about 60 seconds.

According to embodiments of the invention, multi-pass compact heat exchangers are used to carry out supplemental heat transfer from hot gas streams. These include two external heat exchangers, which operate on cyclic duty in synchronization with the cyclic operation of the reactors. The heat exchange is further complemented with the internal regenerative heat exchange using inert layers of ceramic material. The external heat exchangers allow heat exchange between the inlet and outlet of the same streams, for example air and waste nitrogen stream or recycled flue gas and oxygen-rich streams. On the other hand, internal regenerative heat exchange allows heat exchange between two different streams, for example air and oxygen rich stream and waste nitrogen and recycled flue gas. This heat exchange philosophy also allows the use of low temperature switchover valves and enhances the reliability of the cyclic process.

The multi-pass exchangers, which are a part of the compact heat exchanger family, offer significant thermal advantages over conventional shell and tube exchangers. They are available commercially and may be employed for pressures as high as 2000 bar and temperatures as high as 800° C. A detailed review of compact heat exchangers can be found in an article by V. V. Wadekar, in CEP, December 2000, which is herein incorporated by reference. For high temperature applications, these heat exchangers are typically fabricated from stainless steel or other alloys.

While multi-pass exchangers are integral part of the schemes presented here, it may also be possible to adjust process parameters to complete all heat exchange using inert materials placed inside the reactor. This will eliminate the need for external heat exchange. On the other hand, it is also possible to carry out all heat exchange in heat exchangers thereby eliminating the need for inert layers within the reactor vessels.

One characteristic of cyclic processes is the possibility of contamination of the desired product stream with impurities as a result of vessel voids. For the present case, this means that the oxygen rich stream may get contaminated with nitrogen present in the voids at the end of the oxygen retention step. In order to avoid this, an additional step may be introduced. In this step the reactor will be rinsed with steam after the oxygen retention step. This will remove any nitrogen that may be present in the voids. The reactor now can be purged with the combustion exhaust gas or flue gas.

The oxygen-selective ceramic materials are typically oxygen-selective mixed conductors, which exhibit both high electronic and oxygen ionic conductivities at elevated temperature. Examples of these mixed conductors are perovskite-type oxides, $CeO_2$-based oxides, $Bi_2O_3$-based oxides, $ZrO_2$-based oxides, and brownmillerite oxides. In order to further enhance its electronic conductivity and catalytic activity for oxygen ionization, some metal phase can be added into the ceramic material to form a ceramic-metal composite. The metals can be selected from Cu, Ni, Fe, Pt, Pd, Rh and Ag.

In general, the oxygen-selective ceramic materials retain oxygen through conduction of oxygen ions and filling up the oxygen vacancies in its bulk phase. The oxygen retention capacity usually increases with increasing oxygen partial pressure and decreasing temperature. Therefore, the retention and release of oxygen into and from the ceramic material during retention and release steps perform efficiently in that the oxygen partial pressure during the retention step is much higher than that in the release step.

In a preferred embodiment, the at least one oxygen-selective ceramic material comprises an oxygen-selective mixed ionic and electronic conductor. In a more preferred embodiment, the oxygen-selective ceramic material comprises a perovskite-type ceramic having the structural formula $A_{1-x}M_xBO_{3-\delta}$, where A is an ion of a metal of Groups 3a and 3b of the periodic table of elements or mixtures thereof; M is an ion of a metal of Groups 1a and 2a of the periodic table or mixtures thereof; B is an ion of a d-block transition metal of the periodic table or mixtures thereof; x varies from >0 to 1; and $\delta$ is the deviation from stoichiometric composition resulting from the substitution of ions of metals of M for ions of metals of A.

In a more preferred embodiment, the at least one oxygen-selective ceramic material is a perovskite-type ceramic and x varies from about 0.1 to 1.

In another more preferred embodiment, the at least one oxygen-selective ceramic material is a perovskite-type ceramic and A is one or more f-block lanthanides. In a more preferred embodiment, A is La, Y, Sm or mixtures thereof.

In another more preferred embodiment, the at least one oxygen-selective ceramic material is a perovskite-type ceramic and M is at least one metal of Group 2a of the periodic table of elements. In a more preferred embodiment M is Sr, Ca, Ba or mixtures thereof.

In another more preferred embodiment, the at least one oxygen-selective ceramic material is a perovskite-type ceramic and B is Ti, V, Cr, Mn, Fe, Co, Ni, Cu, Zn or mixtures thereof. In a more preferred embodiment, B is V, Fe, Ni, Cu or mixtures thereof.

In another more preferred embodiment, the at least one oxygen-selective ceramic material is a perovskite-type ceramic and x is about 0.2 to 1.

In another more preferred embodiment, the at least one oxygen-selective ceramic material is a perovskite-type ceramic and A is La, Y, Sm or mixtures thereof, M is Sr, Ca or mixtures thereof, and B is V, Fe, Ni, Cu or mixtures thereof.

In another embodiment, the at least one oxygen-selective ceramic material conductor is a member selected from the group consisting of (1) ceramic substances selected from the group consisting of $Bi_2O_3$, $ZrO_2$, $CeO_2$, $ThO_2$, $HfO_2$ and mixtures thereof, the ceramic substances being doped with CaO, rare earth metal oxides or mixtures of these; (2) brownmillerite oxides; and (3) mixtures of these.

In another embodiment, the at least one oxygen-selective ceramic material conductor is at least one ceramic substance selected from the group consisting of $Bi_2O_3$, $ZrO_2$, $CeO_2$, $ThO_2$, $HfO_2$ and mixtures of theses, and the at least one ceramic substance is doped with a rare earth metal oxide selected from the group consisting of $Y_2O_3$, $Nb_2O_3$, $Sm_2O_3$, $Gd_2O_3$ and mixtures of these.

EXAMPLES

Example 1

Preparation of $La_{0.2}Sr_{0.8}Co_{0.6}Fe_{0.4}O_{3-\delta}$ Perovskite Powder

The powder of perovskite-type oxide was prepared first by mixing of corresponding metal oxides or hydroxides and then repeated steps of sintering, ball-milling and filtration for three times. The temperatures in 3 sintering steps were, respectively, 900° C., 950° C. and 1000° C., and the sintering time was 8 hours. The first sintering was conducted right after dry-mixing of $La_2O_3$, $Sr(OH)_2 \cdot 8H_2O$, $Ni_2O_3$, $Co_2O_3$ and $Fe_2O_3$. The ball milling of the material was carried out with grinding media and water after each sintering. The solid was collected by filtration after ball milling. The filtration cake was dried at 100° C. for overnight before it was subjected to the next sintering. After the last ball-milling, the dried filtration cake was crushed and ground into fine powder. The final powder had a perovskite-type phase structure.

Example 2

Fabrication of $La_{0.2}Sr_{0.8}Co_{0.6}Fe_{0.4}O_{3-\delta}$ Perovskite Extrudates The perovskite-type oxide powder made in Example 1 was transformed into a slurry after addition of about 5 wt % hydroxyethyl cellulose and 14.5 wt % water. Thus obtained slurry was aged overnight before it was loaded into an extruder and transformed into extrudates (3 mm in diameter and 4 mm in length). The extrudates were dried in an oven at 90° C. for about 2 hr, and then calcined at 600° C. for 5 hr. The extrudates were finally sintered at 1050° C. for 8 h. The final extrudates were porous and mechanically strong.

Example 3

The extrudates made in Example 2 were packed in a tubular reactor made of high temperature metal alloy. The reactor was designed in such a way that the gas streams of air, $CO_2$ and steam could be fed into the reactor from either the top end or the bottom end of the reactor as required. Mass flow controllers controlled the flow rates of the gas streams. The reactor temperature and valves were controlled with PLC. The product and waste streams during purge and retention steps were collected in a tank, and their average compositions were analyzed with a gas analyzer and a GC. In the experiment, the reactor temperature was controlled at 825° C. An air stream at 7.6 slpm and a $CO_2$ stream at 4.7 slpm were alternately fed into the reactor for every 30 seconds in a counter-current fashion. The reactor pressures were kept at 23.7 psia and 18.7 psia respectively during air and $CO_2$ steps. During the last 2 seconds of the air step, the reactor pressure decreased from 23.7 psia to 18.7 psia. The average product composition during $CO_2$ step was: 27.8% $O_2$, 67.1% CO2 and 7.4% N2, while the waste stream generated during air step contained 2.3% O2, 12.5% CO2 and 83.5% N2. This demonstrates that an oxygen-rich stream containing primarily CO2 and O2 can be produced with the process disclosed in this invention

Example 4

In this experiment, an air stream at 7.6 slpm and a stream of $CO_2$+steam mixture at 4.5 slpm were alternately fed into the reactor described in Example 3 for every 30 seconds in a counter-current fashion. The reactor pressures were kept at 23.7 psia and 18.7 psia respectively during air and $CO_2$+ steam steps. The average product composition (on a dry basis) during $CO_2$+steam step was: 40.8% $O_2$, 44.5% CO2 and 14.7% N2, while the waste stream generated during air step contained 3.7% O2, 11.4% CO2 and 84.9% N2. This result indicates that an oxygen-rich stream can be produced with a mixture of CO2 and steam as purge gas using the process disclosed in this invention.

Example 5

In this experiment, an air stream at 7.6 slpm and a stream of steam at 6.2 slpm were alternately fed into the reactor described in Example 3 for every 30 seconds in a counter-current fashion. The reactor pressures were kept at 23.7 psia and 18.7 psia respectively during air and steam steps. The average product composition (on a dry basis) during steam step was: 70.4% $O_2$, 29.6% N2, while the waste stream generated during air step contained 0.3% O2 and 99.7% N2 (with trace amount other non-oxygen gases). This result showed that an oxygen-rich stream can be produced with stream as purge gas using the process disclosed in this invention.

TABLE 1

Summary of the results in Examples 3-5

| Example # | | Product | | | | Waste Stream | | | |
|---|---|---|---|---|---|---|---|---|---|
| | | Flow | $O_2$ % | $CO_2$ % | $H_2O$ % | $N_2$ % | Flow | $O_2$ % | $CO_2$ % | $N_2$ % |
| 3 | Dry | 5.36 | 27.8 | 67.1 | 0 | 7.4 | 7.02 | 2.3 | 12.5 | 83.4 |
| | wet | 5.36 | 27.8 | 67.1 | 0 | 7.4 | 7.02 | 2.3 | 12.5 | 83.4 |

TABLE 1-continued

Summary of the results in Examples 3-5

| Example | | Product | | | | | Waste Stream | | | |
|---|---|---|---|---|---|---|---|---|---|---|
| # | | Flow | $O_2$ % | $CO_2$ % | $H_2O$ % | $N_2$ % | Flow | $O_2$ % | $CO_2$ % | $N_2$ % |
| 4 | Dry | 3.82 | 40.8 | 44.5 | 0 | 14.7 | 5.75 | 3.7 | 11.4 | 84.9 |
|   | wet | 6.06 | 25.7 | 28.1 | 37.0 | 9.3 | 5.75 | 3.7 | 11.4 | 84.9 |
| 5 | Dry | 3.37 | 70.3 | 0 | 0 | 29.6 | 6.99 | 0.3 | 0 | 99.7 |
|   | wet | 9.59 | 24.7 | 0 | 64.9 | 10.4 | 6.99 | 0.3 | 0 | 99.7 |

Table 1 summarizes the results in Examples 3-5 and compares the product compositions on the wet basis, i.e. including the steam in the product stream. As shown, $O_2$ concentration in the product on the wet basis increases with increasing $CO_2$ concentration in the purge gas, indicating that $CO_2$ has stronger regeneration capability than steam. As noted in the examples, there was some amount of nitrogen still presented in the product stream due to the void space in the reactor. This nitrogen can be easily eliminated from the void space by an additional step between the air and the purge gas steps.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A method of operating an oxygen consuming process comprising sequentially the steps:
   a) feeding air through a reactor containing an oxygen selective mixed conductor, whereby oxygen is retained on said oxygen selective mixed conductor and said reactor is at a temperature greater than 300° C.;
   b) feeding at least part of an oxygen-depleted product gas from said oxygen consuming process into said reactor, thereby forming an oxygen-containing gas stream substantially free of nitrogen; and
   c) feeding said oxygen-containing gas stream substantially free of nitrogen into said oxygen consuming process further producing a product gas stream comprising carbon dioxide and at least part of said carbon dioxide is recovered.

2. A method for forming a product gas stream for use in an oxygen consuming process comprising the steps:
   (a) feeding air through a first heat exchanger and into a reactor containing an oxygen selective mixed conductor, whereby oxygen is retained on said oxygen selective mixed conductor and said reactor is at a temperature greater than 300° C.; and
   (b) feeding an oxygen-depleted gas stream through a second heat exchanger and through said reactor, whereby oxygen is released from said oxygen selective mixed conductor forming said product gas stream.

3. The method as claimed in claim 2 wherein said method is cyclical.

4. The method as claimed in claim 3 wherein said cyclical method is thermally self-sustaining.

5. The method as claimed in claim 2 wherein a fuel gas is added to said oxygen-depleted gas stream.

6. The method as claimed in claim 5 wherein said fuel gas is selected from the group consisting of carbon monoxide, hydrogen, methane and mixtures thereof.

7. The method as claimed in claim 2 wherein said heat exchangers are multi-pass heat exchangers.

8. The method as claimed in claim 2 wherein nitrogen-rich gas is produced as a by-product during the oxygen retention step (a).

9. The method as claimed in claim 2 wherein said air and said oxygen-depleted gas stream are fed to said reactor in a counter-current manner.

10. The method as claimed in claim 2 wherein said second heat exchanger increases the temperature of said oxygen-depleted gas stream to about 900° C.

11. The method as claimed in claim 2 wherein said oxygen-depleted gas stream contains up to about 5% oxygen.

12. The method as claimed in claim 2 wherein said oxygen-selective mixed conductor is a perovskite type ceramic having the structural formula $A_{1-x}M_xBO_{3-\delta}$.

13. The method as claimed in claim 12 wherein A is a rare earth ion, M is Sr, Ca, Ba, V or mixtures of these; B is Co, Mn, Cr, Fe or mixtures of these; x varies from greater than 0 to about 1; and δ is the deviation from stoichiometric composition resulting from the substitution of Sr, Ca and Ba for rare earth ions.

14. The method as claimed in claim 13 wherein x varies from about 0.1 to about 1.

15. The method as claimed in claim 13 wherein A is La, Y or mixtures of these; M is Sr, Ca or mixtures of these; and B is Co, Fe or mixtures of these.

16. The method as claimed in claim 15 wherein x is about 0.2 to 1.

17. The method as claimed in claim 3 wherein said first heat exchanger and said second heat exchanger are selected from the group consisting of internal heat exchangers, external heat exchangers and combinations of internal and external heat exchangers.

* * * * *